United States Patent
Sorin et al.

(10) Patent No.: US 9,065,587 B2
(45) Date of Patent: Jun. 23, 2015

(54) OPTICAL MULTIPLEXING USING LASER ARRAYS

(75) Inventors: Wayne V. Sorin, Moutain View, CA (US); Michael Renne Ty Tan, Menlo Park, CA (US); Sagi Varghese Mathai, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 84 days.

(21) Appl. No.: 13/825,950

(22) PCT Filed: Oct. 8, 2010

(86) PCT No.: PCT/US2010/052013
§ 371 (c)(1),
(2), (4) Date: Mar. 25, 2013

(87) PCT Pub. No.: WO2012/047232
PCT Pub. Date: Apr. 12, 2012

(65) Prior Publication Data
US 2013/0195456 A1    Aug. 1, 2013

(51) Int. Cl.
*H04J 14/02* (2006.01)
*H04B 10/532* (2013.01)
(Continued)

(52) U.S. Cl.
CPC ............. *H04J 14/02* (2013.01); *H04B 10/532* (2013.01); *H04B 10/504* (2013.01); *H04B 10/506* (2013.01); *H04J 14/06* (2013.01)

(58) Field of Classification Search
CPC .. H04B 10/504; H04B 10/506; H04B 10/532; H04J 14/02; H04J 14/06
USPC .................................................. 398/91, 184
See application file for complete search history.

(56) References Cited

U.S. PATENT DOCUMENTS

| 6,002,705 A | 12/1999 | Thornton |
| 6,122,417 A | 9/2000 | Jayaraman et al. |
| 6,154,479 A | 11/2000 | Yoshikawa et al. |

(Continued)

FOREIGN PATENT DOCUMENTS

| CN | 1264971 A | 8/2000 |
| CN | 101667880 | 3/2010 |

(Continued)

OTHER PUBLICATIONS

Chen et al, "High Utilization of Wavelengths and Simple Interconnection Between Users in a Protection Scheme for Passive Optical Networks", IEEE Photonics Technology Letters, vol. 21, No. 6, Mar. 15, 2008 pp. 389-391.*

Li, Jianqiang et al., "Experimental Demonstration of Polarization Multiplexing for Simultaneously Providing Broadband Wireless and Wired Access", Optics Communications, vol. 281, Issue 10, May 15, 2008, pp. 2806-2810.

(Continued)

*Primary Examiner* — Leslie Pascal
(74) *Attorney, Agent, or Firm* — Tarolli, Sundheim, Covell & Tummino

(57) ABSTRACT

An optical data system and method are disclosed. The system can be an integrated optical data transmission system that includes an array of lasers that are modulated by a plurality of modulation signals to provide a plurality of sets of optical data signals. Each of the optical data signals in each of the plurality of sets can have a distinct wavelength. The system can also include a wavelength division multiplexing system to combine each of the plurality of sets of optical data signals to generate a plurality of multi-channel optical data signals that are transmitted via a respective plurality of optical transmission media.

20 Claims, 4 Drawing Sheets

(51) Int. Cl.
*H04B 10/50* (2013.01)
*H04J 14/06* (2006.01)

(56) References Cited

U.S. PATENT DOCUMENTS

| | | | |
|---|---|---|---|
| 6,563,976 | B1 | 5/2003 | Grann et al. |
| 6,660,548 | B2 * | 12/2003 | Naydenkov et al. ............ 438/26 |
| 6,693,934 | B2 | 2/2004 | Wang |
| 6,836,501 | B2 | 12/2004 | Cox et al. |
| 7,263,291 | B2 | 8/2007 | Mahgerefteh et al. |
| 7,693,424 | B1 | 4/2010 | Krishnamoorthy et al. |
| 8,532,445 | B2 * | 9/2013 | Morris et al. ................... 385/24 |
| 2001/0014193 | A1 | 8/2001 | Shibuya |
| 2002/0154355 | A1 | 10/2002 | Payne et al. |
| 2003/0186476 | A1 | 10/2003 | Naydenkov et al. |
| 2004/0096221 | A1 | 5/2004 | Mahgerefteh et al. |
| 2005/0036533 | A1 | 2/2005 | Cox et al. |
| 2005/0135449 | A1 * | 6/2005 | Sorin et al. ...................... 372/50 |
| 2009/0103921 | A1 | 4/2009 | Frankel |

FOREIGN PATENT DOCUMENTS

| | | |
|---|---|---|
| CN | 1367593 A | 9/2012 |
| DE | 3716247 | 11/1988 |
| EP | 0782328 | 7/1997 |
| WO | WO-00-49687 | 8/2000 |
| WO | WO-03088439 | 10/2003 |
| WO | WO-2010006081 | 1/2010 |

OTHER PUBLICATIONS

Goodwill, D. J. "Optical Interconnect Module Extensible to 10,000 Parallel Channels for a Smart-Pixel Optical Backplane", http://ieeexplore.ieee.org/xpl/freeabs_all.jsp?arnumber=540745 IEEE Xplore Digital Library, Aug. 6, 2002, p. 1.

Onishi, T. et al., "Polarization Control of VCSEL Array by Metal Nanoholes at Rectangular Lattice Utilizing Surface Plasmon Resonance", Semiconductor Laser Conference, Oct. 2006, Conference Digest, 2006 IEEE 20th International, pp. 103-104.

Onishi, Toshikazu, et al. "Polarization Control of VCSEL Array Utilizing Surface Plasmon Resonance." IEIC Technical Report (Institute of Electronics, Information and Communication Engineers) 106.404 (2006): 17-20.

Rochat, E., S. D. Walker, and M. C. Parker. "Investigation of combined wavelength and polarisation division multiplexing in C-band over 50 μm multimode fibre links up to 3 km." Lasers and Electro-Optics Europe, 2003. CLEO/Europe. 2003 Conference on. IEEE, 2003.

Van Den Borne, D. et al., "PMD-Induced Transmission Penalties in Polarization-Multiplexed Transmission", Journal of Lightwave Technology, vol. 23 Issue 12, Dec. 2005, pp. 4004-4015.

Zhou, Yuxin, et al. "High-speed wavelength-division multiplexing and demultiplexing using monolithic quasi-planar VCSEL and resonant photodetector arrays with strained InGaAs quantum wells." Photonics Technology Letters, IEEE 12.2 (2000): 122-124.

International Search Report, May 25, 2011, PCT Application No. PCT/US2010/052013.

\* cited by examiner

OPTICAL MULTIPLEXING USING LASER ARRAYS

BACKGROUND

Optical data rate connectivity, such as in computer systems, is constantly increasing to meet consumer demands for increased bandwidth. As an example, optical data rate connectivity may be required in the future to achieve bandwidths in the Terahertz range.

DETAILED DESCRIPTION

Figure 1:
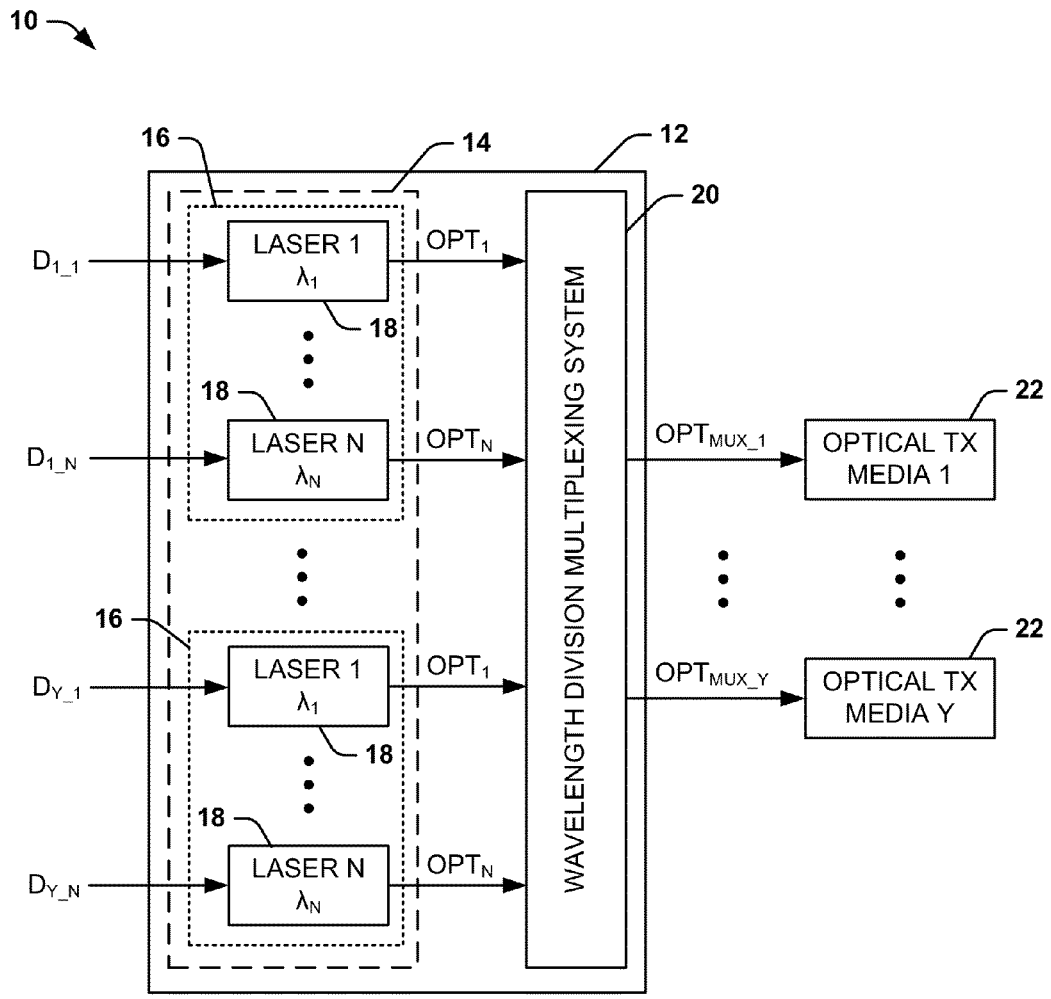
FIG. 1 illustrates an example of an optical data system.

FIG. 1 illustrates an example of an optical data system 10. The optical data system 10 can be incorporated in any of a variety of computer systems to transfer data. As one example, the optical data system can be implemented as an optical transmission system for sending data as optical signals across an optical backplane (e.g., a waveguide) of a computer system. The optical data system 10 includes an integrated package 12, such as can be configured as a chip on a computer motherboard.

A plurality of Y sets of N data modulation signals, are provided to the integrated package, where Y and N are each positive integers greater than two (Y denoting the number of sets and N denoting the number signals in a given set). While in the example of FIG. 1, each of the Y sets is shown as including the same number N optical signals, different sets can include different numbers of signals. In the example of FIG. 1, the data modulation signals are demonstrated as data modulation signals $D_{1\_1}$ through $D_{1\_N}$ in the first set and data modulation signals $D_{Y\_1}$ through $D_{Y\_N}$ in the Nth set. As an example, the data modulation signals $D_{1\_1}$ through $D_{Y\_N}$ can each be individual radio frequency (RF) data signals for encoding data corresponding to distinct transmission of separate data channels.

The integrated package 12 includes one or more laser arrays 14. The laser array 14 can include a plurality Y of sets 16 of lasers 18. Each of lasers 18 in each of the sets 16 is demonstrated as emitting illumination at a different wavelength, demonstrated as $\lambda_1$ through $\lambda_N$ for each respective data modulation signal. For example, the wavelengths can be spaced apart from each other at a spacing that is greater than about 10 nm (e.g., corresponding to spacing used in coarse wavelength division multiplexing). Each of the lasers 18 are thus demonstrated as emitting an optical data signal, demonstrated as optical signals $OPT_1$ through $OPT_N$ in each set 16, with each of the optical signals $OPT_1$ through $OPT_N$ having the respective wavelengths $\lambda_1$ through $\lambda_N$. Additionally, it is also to be understood that the wavelengths $\lambda_1$ through $\lambda_N$ in one set 16 could be different from the wavelengths $\lambda_1$ through $\lambda_N$ in a different set 16. Furthermore, because the data modulation signals $D_{1\_1}$ through $D_{Y\_N}$ can be provided as distinct channel signals, the optical signals $OPT_1$ through $OPT_N$ can likewise represent distinct data channels with respect to each other and with respect to each set 16.

The laser array 14 can be implemented as one or more arrays of lasers. As an example, the laser array 14 can be configured as a single two-dimensional array of lasers or multiple one-dimensional arrays of lasers and can be arranged in the same plane with respect to each other. The lasers 18 can be configured as a variety of different kinds of lasers. As an example, the lasers 18 can be configured as surface emitting lasers, such as vertical cavity surface emitting lasers (VCSELs), such that the laser array is implemented as an array of VCSELs. Alternatively, the lasers 18 can be implemented as distributed feedback (DFB) lasers, such as surface emitting DFB lasers. Furthermore, the one or more arrays of the lasers 18 that constitute the laser array 14 can be arranged on the same substrate, or each array itself is arranged on the same substrate which is separate from the substrate for one or more other arrays. This arrangement of lasers 18 in the array 14 can implement low-cost lasers that occupy a small physical space, such as can be manufactured for use in a confined space in an associated computer system.

The optical data system 10 also includes a wavelength division multiplexing (WDM) system 20 that is configured to provide wavelength division multiplexing for each set 16 of the optical data signals $OPT_1$ through $OPT_N$, such that each of the sets 16 of the optical data signals $OPT_1$ through $OPT_N$ are combined to generate multi-channel optical data signals $OPT_{MUX\_1}$ through $OPT_{MUX\_Y}$. Each of the dual-channel optical data signals $OPT_{MUX\_1}$ through $OPT_{MUX\_Y}$ are then provided to respective optical transmission media 22, which can be configured as a waveguide, such as one or more optical fibers or as one or more a hollow-metal waveguides.

The multi-channel optical data signals $OPT_{MUX\_1}$ through $OPT_{MUX\_Y}$, and thus the optical transmission media 22 are demonstrated in the example of FIG. 1 as numbering 1 through Y, and thus numbering the same as the sets 16 of data modulation signals and lasers 18. The wavelength division multiplexing of each of the sets 16 of the optical data signals $OPT_1$ through $OPT_N$ to generate the multi-channel optical data signals $OPT_{MUX\_1}$ through $OPT_{MUX\_Y}$ can thus result in a significant cost and space reduction, as opposed to optical transmission of each of the optical data signals $OPT_1$ through $OPT_N$ individually through a separate transmission media.

The WDM system 20 can be configured in a variety of ways. For instance, the WDM system 20 can include a set of optical components that are configured to combine the optical data signals $OPT_1$ through $OPT_N$ in each of the sets 16 such that they propagate substantially collinearly as the multi-channel optical data signals $OPT_{MUX\_1}$ through $OPT_{MUX\_Y}$. As an example, the WDM system 20 can include at least one wavelength-division multiplexing (WDM) filter that is configured to reflect one of the optical signals $OPT_1$ through $OPT_N$ in each set 16 and to pass the remaining optical signals $OPT_1$ through $OPT_N$ of the set 16.

As another example, the optical data signals $OPT_1$ through $OPT_N$ in each set 16 can include pairs of orthogonally polarized optical data signals. Thus, the wavelength division multiplexing system 20 can include a birefringent (i.e., walk-off) crystal that is configured to combine the optical data signals $OPT_1$ through $OPT_N$ based on a spatial walk-off of one of the optical data signals $OPT_1$ through $OPT_N$ at a first surface of the birefringent crystal and a second spatial walk-off of the optical data signals $OPT_X$ and $OPT_Y$ at a second surface of the birefringent crystal, which walk-off depends on the polarization states of the respective signal. For instance, the polarization state for each of the optical data signals can be controlled by employing polarization control of laser arrays or by employing a polarizing structure (e.g., a half-wave plate) to orthogonally polarize one of each pair of optical data signals.

Additionally, the WDM system 20 can be implemented as a single integrated package 12 to optically multiplex the optical signals in each of the plurality of sets 16. Those skilled in the art will understand that the wavelength division multiplexing system 20 can be configured in a variety of ways. The WDM system 20 being implemented in the integrated package 12 with the lasers 18 can be implemented to perform the WDM of the optical signal directly from one or more arrays of lasers 14, such that no intervening optical waveguides (e.g., fiber) and associated optical couplers are required. Such an approach allows the entire system to be fabricated in the integrated package 12 with a common substrate (e.g., silicon) and dimensioned to be about equal to or less than one $cm^3$.

Figure 2:
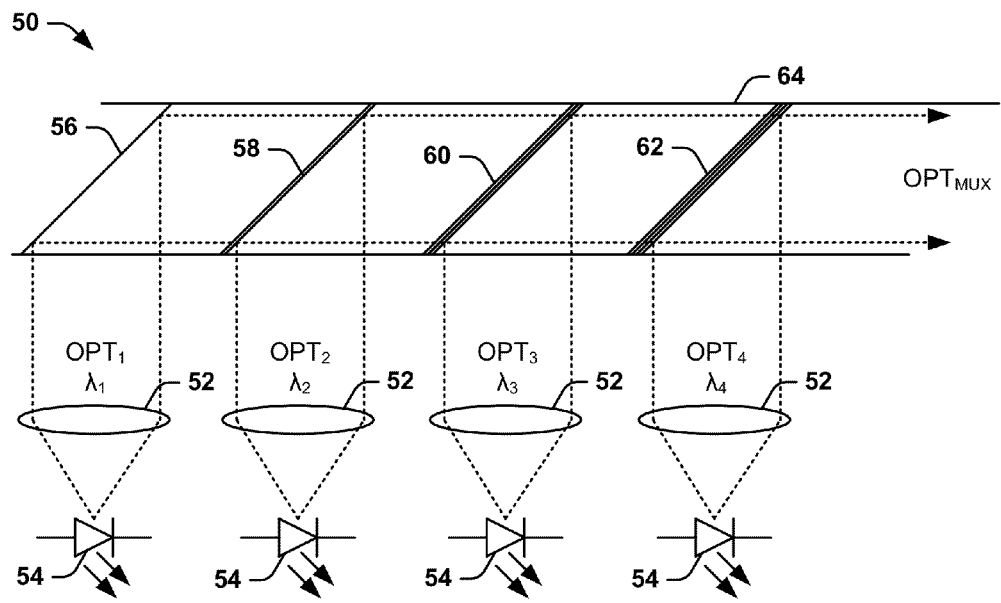
FIG. 2 illustrates an example of an optical wavelength multiplexing system.

FIG. 2 illustrates an example of a WDM system 50. The WDM system 50 can be implemented as the WDM system 20 in the example of FIG. 1. Therefore, reference may be made to the example of FIG. 1 in the following description of the example of FIG. 2 for additional context. In the example of FIG. 2, the integer N is demonstrated as four, such that the WDM system 50 demonstrates wavelength division multiplexing of a single set 16 of four optical data signals $OPT_1$ through $OPT_4$.

The WDM system 50 includes a set of lenses 52 configured to substantially collimate the optical data signals $OPT_1$ through $OPT_4$ that are respectively generated by a set of four lasers 54. As an example, the lasers 54 can correspond to a given set 16 of the lasers 18, respectively, in the example of FIG. 1. For example, the lasers 54 can be configured as surface emitting lasers, such as VCSELs, that are each one of a plurality of lasers in separate respective one-dimensional arrays of lasers or one two-dimensional array of lasers (i.e., in the direction of the page). Thus, the lasers 54 can occupy the same substrate as each other and/or with other lasers in the array. Alternatively, each of the lasers 54 can itself be implemented as an array of lasers, such as VCSELs residing along a line that is orthogonal to the page.

The WDM system 50 includes a reflector 56, a first WDM filter 58, a second WDM filter 60, and a third WDM filter 62. As an example, the WDM filters 58, 60, and 62 can be configured as dielectric films of varying thickness, such as to selectively reflect and pass optical signals based on wavelength. In the example of FIG. 2, the reflector 56 is arranged at an approximate 45° angle in the optical path of the first optical data signal $OPT_1$ to reflect the first optical data signal $OPT_1$ in an orthogonal direction. Similarly, WDM filters 58, 60, and 62 are arranged at an approximate 45° angle in the optical paths of the optical data signals $OPT_2$, $OPT_3$, and $OPT_4$, respectively. The WDM filter 58 can be configured as reflective only of the wavelength $\lambda_2$, the second WDM filter 60 can be configured as reflective only of the wavelength $\lambda_3$, and the third WDM filter 62 can be configured as reflective only of the wavelength $\lambda_4$.

In the example of FIG. 2, the first WDM filter 58 is configured to pass the first optical data signal $OPT_1$ therethrough, after being reflected from the mirror 56, and to orthogonally reflect the second optical data signal $OPT_2$. Similarly, the second WDM filter 60 is configured to pass the first and second optical data signals $OPT_1$ and $OPT_2$ therethrough and to orthogonally reflect the third optical data signal $OPT_3$. Furthermore, the third WDM filter 62 is configured to pass the optical data signals $OPT_1$, $OPT_2$, and $OPT_3$ therethrough and to orthogonally reflect the fourth optical data signal $OPT_4$. Therefore, the WDM filters 58, 60, and 62 allow the optical data signals $OPT_1$ through $OPT_4$ to propagate substantially collinearly. Accordingly, the optical data signals $OPT_1$ and $OPT_4$ become wavelength division multiplexed to generate the multi-channel optical signal $OPT_{MUX}$.

The multi-channel optical signal $OPT_{MUX}$ can then propagate through a waveguide. In one example, a structure 64 containing the reflector 56 and the filters 58, 60, 62 can be implemented as a waveguide (e.g., a hollow metal waveguide) that can propagate the multi-channel optical signal $OPT_{MUX}$ to a desired destination. For instance, the structure 64 can provide the multi-channel optical signal $OPT_{MUX}$ to an optical receiver or to another transmission media. As shown in FIG. 2, the WDM system 50 can be integrated in a common package with the lasers 54 as to receive the optical signals directly from the respective lasers, such that no intervening optical waveguides (e.g., fiber or the like) and associated optical couplers are required.

Figure 3:
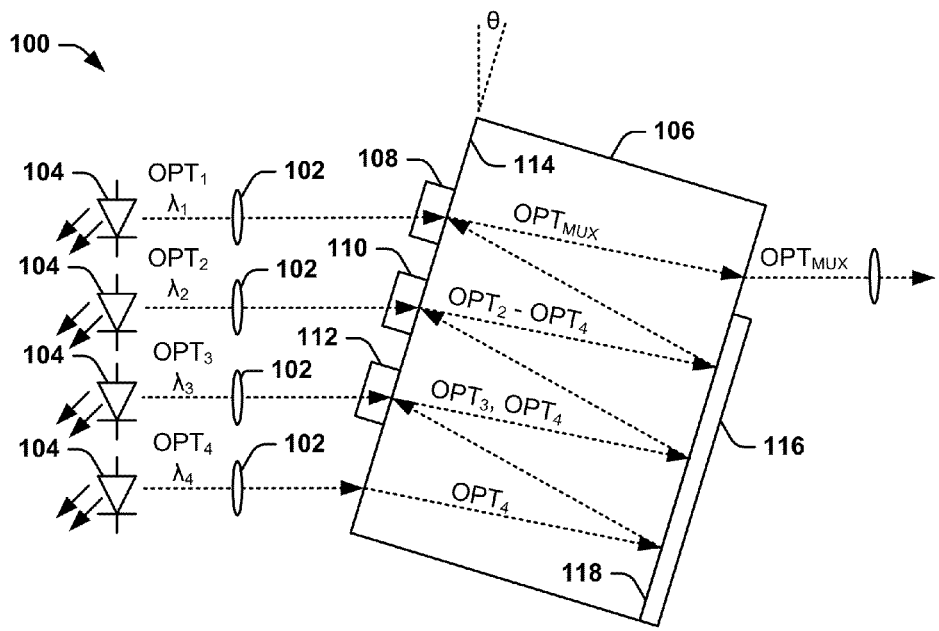
FIG. 3 illustrates another example of an optical wavelength multiplexing system.

FIG. 3 illustrates yet another example of a WDM system 100. The WDM system 100 can be configured as the WDM system 20 in the example of FIG. 1. Therefore, reference is to be made to the example of FIG. 1 in the following description of the example of FIG. 3. In the example of FIG. 3, the integer N is demonstrated as four, such that the WDM system 100 demonstrates wavelength division multiplexing of a single set 16 of four optical data signals $OP_{T1}$ through $OP_{T4}$. The system 100 is equally applicable to other numbers of optical signals, which may be more or less than four.

The WDM system 100 includes a set of lenses 102 configured to substantially collimate the optical data signals $OPT_1$ through $OPT_4$ that are respectively generated by a set of respective lasers 104. As an example, the lasers 104 can correspond to a given set 16 of the lasers 18, respectively, in the example of FIG. 1. For example, the lasers 104 can be configured as surface emitting lasers, such as VCSELs, which are each one of a plurality of lasers in separate respective one-dimensional arrays of lasers or one two-dimensional array of lasers (i.e., in a direction that is orthogonal to the page). Thus, the lasers 104 can occupy the same substrate as each other and/or with other lasers in the respective array.

In the example of FIG. 3, the WDM system 100 includes a solid optical medium 106 that is oriented at an angle θ with respect to the lasers 104. The solid optical medium 106 can be implemented as any solid material having an optical transmissivity that is less than about 1 dB of propagation loss. Examples of solid optical medium include glass and plastic materials. A first WDM filter 108, a second WDM filter 110, and a third WDM filter 112 are each operatively coupled to (e.g., attached) a first surface 114 of the solid optical medium 106. The first WDM filter 108 is arranged in the optical path of the first optical data signal $OPT_1$, the second WDM filter 110 is arranged in the optical path of the second optical data signal $OPT_2$, and the third WDM filter 112 is arranged in the optical path of the third optical data signal $OPT_3$. In the example of FIG. 3, the WDM filter 108 can be configured as reflective of the wavelengths $\lambda_2$, $\lambda_3$, and $\lambda_4$. Similarly, the second WDM filter 110 can be configured as reflective of the wavelengths $\lambda_3$ and $\lambda_4$, and the third WDM filter 112 can be configured as reflective only of the wavelength $\lambda_4$.

The fourth optical data signal OPT4 is refracted at the first surface 114 of the optical medium 106. Similarly, upon the first, second, and third optical data signals $OPT_1$ through OPT3 passing through the respective WDM filters 108, 110, and 112, the optical data signals $OPT_1$ through $OPT_3$ are each likewise refracted at the first surface 114 of the optical medium 106. The fourth optical data signal $OPT_4$, upon propagating through the optical medium 106, is reflected from a mirror 116 that is coupled to a second surface 118 of the optical medium 106. The angle θ can be set such that the fourth optical data signal $OPT_4$ is reflected from the mirror 116 to the third WDM filter 112, which can be configured to likewise reflect the fourth optical data signal $OPT_4$. Therefore, upon the fourth optical data signal $OPT_4$ being reflected from the third WDM filter 112, the optical data signals $OPT_3$ and $OPT_4$ propagate substantially collinearly through the optical medium 106.

The combined third and fourth optical data signals $OPT_3$ and $OPT_4$ propagate through the optical medium 106 and are reflected from the mirror 116. The reflected combined third and fourth optical data signals $OPT_3$ and $OPT_4$ are reflected from the mirror 116 to the second WDM filter 110, which can be configured to likewise reflect the combined third and fourth optical data signals $OPT_3$ and $OPT_4$. The combined third and fourth optical data signals $OPT_3$ and $OPT_4$ combine with the second optical data signal $OPT_2$. Thus, upon the combined third and fourth optical data signals $OPT_3$ and $OPT_4$ being reflected from the second WDM filter 110, the optical data signals $OPT_2$ through $OPT_4$ propagate substantially collinearly through the optical medium 106.

The combined second, third, and fourth optical data signals $OPT_2$ through $OPT_4$ propagate through the optical medium 106 and are reflected from the mirror 116. The reflected combined second, third, and fourth optical data signals $OPT_2$ through $OPT_4$ are reflected from the mirror 116 to the first WDM filter 108, which can be configured to likewise reflect the combined second, third, and fourth optical data signals $OPT_2$ through $OPT_4$, which combine with the first optical signal $OPT_1$. Thus, upon the combined second, third, and fourth optical data signals $OPT_2$ through $OPT_4$ being reflected from the first WDM filter 108, the aggregated set of optical data signals $OPT_1$ through $OPT_4$ propagate substantially collinearly through the optical medium 106. Accordingly, the optical data signals $OPT_1$ through $OPT_4$ are wavelength division multiplexed to generate the multi-channel optical signal $OPT_{MUX}$. The multi-channel optical signal $OPT_{MUX}$ is refracted upon exiting the second surface 118 of the optical medium 106, and can then be launched into one of the optical transmission media 22, such as an optical fiber or hollow-metal waveguide (e.g., in a multi-mode or single mode manner), via a collimating lens 120. As shown in the example of FIG. 3, the optical medium, which is configured to perform the wavelength division multiplexing, can receive the optical signals directly from the respective lasers via lenses 102, such that no intervening optical waveguides (e.g., fiber or the like) and associated optical couplers are required to perform the multiplexing.

It will be appreciated that FIGS. 2 and 3 are shown for source sides configured for transmitting optical data signals. It will be understood that corresponding receivers can be implemented with substantially identical construction. The corresponding transmitters and receivers can be optically coupled through one or more optical transmission media (e.g., waveguides or optical fibers), such as to form an optical communication system. This further allows cost savings since higher volumes of transmitter and receiver devices can be fabricated from a common design.

Figure 4:
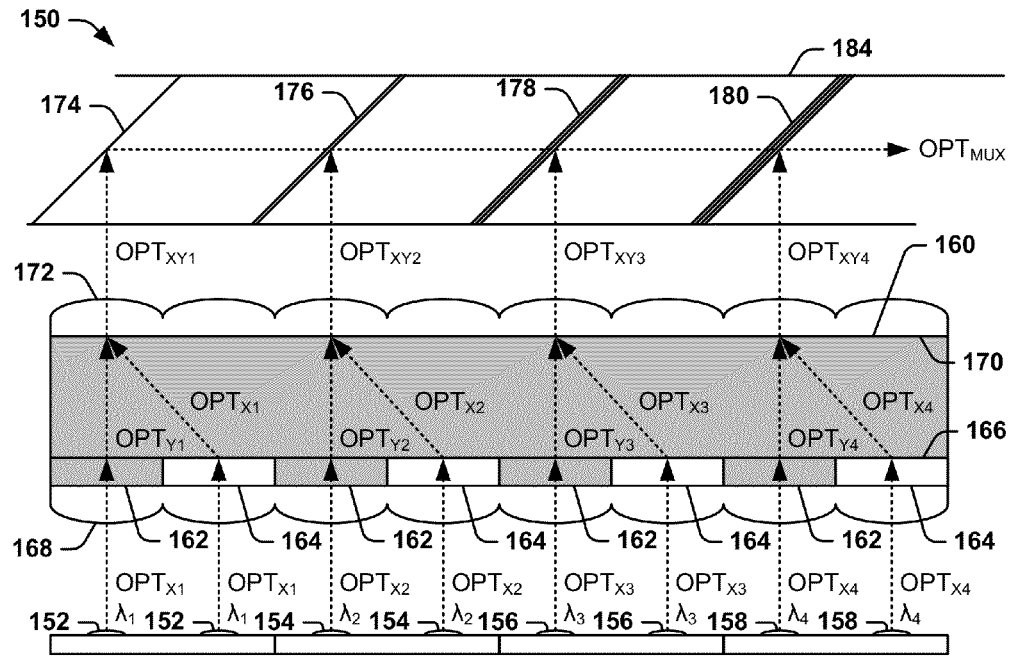
FIG. 4 illustrates an example of an optical wavelength/polarization multiplexing system.

FIG. 4 illustrates another example of a WDM system 150. The WDM system 150 can be configured as the wavelength division multiplexing system 20 in the example of FIG. 1. Therefore, reference may be made to the example of FIG. 1 in the following description of the example of FIG. 4 for additional context. In the example of FIG. 4, the integer N denoting the number of optical channels is demonstrated as four, although other numbers N can be used. The example system 150 demonstrates wavelength division multiplexing of a single set of four optical data signals $OPT_1$ through $OPT_4$.

The WDM system 150 can also increase (e.g., by a factor of two) the number of data channels being multiplexed together by additionally implementing polarization multiplexing in combination with wavelength division multiplexing.

Similar to the other examples shown and described herein, the system 150 is configured to receive the optical signals directly from the respective lasers, such that no intervening optical waveguides (e.g., fiber or the like) and associated optical couplers are required to perform the multiplexing - including both the wavelength division multiplexing and polarization multiplexing. For instance, the system 150 can be fabricated in a single integrated package, such as shown and described herein. As a further example in the context of FIG. 4, the WDM system 150 can be implemented with no intervening waveguides (e.g., no intervening fiber or couplers), although one or more waveguides can be implemented as part of the WDM system itself for multiplexing of the respective wavelengths and propagating the combined.

In the example of FIG. 4, the WDM system 150 includes a first pair of lasers 152 configured to generate a first pair of optical data signals $OPT_{X1}$, a second pair of lasers 154 configured to generate a second pair of optical data signals $OPT_{X2}$, a third pair of lasers 156 configured to generate a third pair of optical data signals $OPT_{X3}$, and a fourth pair of lasers 158 configured to generate a fourth pair of optical data signals $OPT_{X4}$. The optical data signals $OPT_{X1}$ generated by the lasers 152 can each be separately modulated and can have the same polarization and wavelength $\lambda_1$. Similarly, the optical data signals $OPT_{X2}$ through $OPT_{X4}$ generated by the lasers 154, 156, and 158, respectively can each be separately modulated and can have the same polarization and wavelength $\lambda_2$ through $\lambda_4$, respectively. Alternatively, each pair of lasers can be configured to generate optical signals at the same wavelength but different (e.g., orthogonal) polarization. In the example of FIG. 4, the pairs of lasers 152, 154, 156, and 158 are arranged substantially parallel with respect to each other as part of a two-dimensional array on the same substrate. For example, the lasers 152, 154, 156, and 158 can be configured as surface emitting lasers, such as VCSELs implemented in one or more arrays of VCSELs.

As a further example, the WDM system 150 can include a birefringent (i.e., walk-off) crystal 160. The birefringent crystal 160 includes half-wave plates 162 and glass spacers 164 that are each coupled to a first surface 166 of the birefringent crystal 160. The half-wave plates 162 are arranged in the optical paths of one of each of the pairs of optical data signals $OPT_{X1}$ through $OPT_{X4}$ and the glass spacers 164 are arranged in the optical path of the other of each of the pairs of optical data signals $OPT_{X1}$ through $OPT_{X4}$. As an alternative low-cost example, half-wave plates may be omitted and polarization state of the optical signals can be controlled by the lasers 152 and 154. For instance, an array of VCSELs can be implemented in which each pair of lasers 152 and 154 has an orthogonal polarization state.

The optical data signals $OPT_{X1}$ through $OPT_{X4}$ can be emitted from the pairs of lasers 152, 154, 156, and 158, respectively, to a lens array 168 that is coupled to the half-wave plates 162 and the glass spacers 164 and which collimates the optical data signals $OPT_{X1}$ through $OPT_{X4}$. The glass spacers 164 have substantially no polarizing effect on the respective optical data signals $OPT_{X1}$ through $OPT_{X4}$. The half-wave plates 162 rotate the polarization of the optical data signals $OPT_{X1}$ through $OPT_{X4}$ to generate optical data signals $OPT_{Y1}$ through $OPT_{Y4}$ having an orthogonal polarization relative to the optical signals $OPT_{X1}$ through $OPT_{X4}$. Alternatively, the half-wave plates 162 may be omitted from the WDM system 150, and a respective one of each of the pairs of lasers 152, 154, 156, and 158 directly generate the optical signals $OPT_{Y1}$ through $OPT_{Y4}$ with polarization that is orthogonal to the other laser in each respective pair.

The birefringent crystal 160 can be configured as an anisotropic optical medium configure to cause optical signals having one of an extraordinary polarization states (e.g., in the x-direction) to spatially walk-off at a predetermined angle from the incident angle. In contrast, the other optical signal (e.g., having an ordinary polarization in the y-direction) does not experience walk-off. Thus, in the example of FIG. 4, the optical data signals $OPT_{X1}$ through $OPT_{X4}$ at each of the first surface 166 and a second surface 170 experience walk-off at a predetermined angle, and the optical data signals $OPT_{Y1}$ through $OPT_{Y4}$ pass through with substantially no walk-off. For example, upon passing through the half-wave plates 162, the optical data signals $OPT_{Y1}$ through $OPT_{Y4}$ pass through the birefringent crystal 160 with substantially no refractive effect, such that the optical data signals $OPT_{Y1}$ through $OPT_{Y4}$ can propagate straight through the birefringent crystal 160. However, upon passing through the glass spacers 164, the orthogonally polarized optical data signals $OPT_{X1}$ through $OPT_{X4}$ walk-off at both the first surface 164 and the second surface 170 of the birefringent crystal 160, such that the orthogonally polarized optical signals are multiplexed together.

The thickness of the birefringent crystal 160 can be selected based on the walk-off of the optical data signals $OPT_{X1}$ through $OPT_{X4}$. Thus, the pairs of optical data signals $OPT_{X1}$ and $OPT_{Y1}$, $OPT_{X2}$ and $OPT_{Y2}$, $OPT_{X3}$ and $OPT_{Y3}$, and $OPT_{X4}$ and $OPT_{Y4}$, respectively, propagate substantially collinearly from the second surface 170 of the birefringent crystal 160. Accordingly, upon exiting a lens array 172 coupled to the second surface 170 of the birefringent crystal 160, each of the pairs of optical data signals $OPT_{X1}$ and $OPT_{Y1}$, $OPT_{X2}$ and $OPT_{Y2}$, $OPT_{X3}$ and $OPT_{Y3}$, and $OPT_{X4}$ and $OPT_{Y4}$, respectively, are polarization multiplexed to generate dual-channel optical signals $OPT_{XY1}$ through $OPT_{XY4}$ having the wavelengths $\lambda_1$ through $\lambda_4$, respectively.

The multiplexing system 150 also a WDM multiplexer, which can be implemented according to any of the examples shown and described herein. In the example of FIG. 4, the multiplexing system is implemented similar to FIG. 2. Briefly stated, the WDM multiplexer includes a mirror 174, a first WDM filter 176 configured to reflect only the wavelength $\lambda_2$, a second WDM filter 178 configured to reflect only the wavelength $\lambda_3$, and a third WDM filter 180 configured to reflect only the wavelength $\lambda_4$, similar to the WDM system 50 in the example of FIG. 2. Thus, in the example of FIG. 4, the first WDM filter 176 passes the first dual-channel optical data signal $OPT_{XY1}$ therethrough, after being reflected from the mirror 174, and to orthogonally reflect the second dual-channel optical data signal $OPT_{XY2}$. Similarly, the second WDM filter 178 is configured to pass the first and second dual-channel optical data signals $OPT_{XY1}$ and $OPT_{XY2}$ therethrough and to orthogonally reflect the third optical data signal $OPT_{XY3}$. Furthermore, the third WDM filter 180 is configured to pass the dual-channel optical data signals $OPT_{XY1}$ through $OPT_{XY3}$ therethrough and to orthogonally reflect the fourth optical data signal $OPT_{XY4}$. Therefore, the dual-channel optical data signals $OPT_{XY1}$ through $OPT_{XY4}$ become wavelength division multiplexed to generate the multi-channel optical signal $OPT_{MUX}$.

Accordingly, because of the multiplexing of both the X and Y polarizations and multiplexing the wavelengths $\lambda_1$ through $\lambda_4$, the multi-channel optical signal $OPT_{MUX}$ can substantially collinearly propagate eight separate data-carrying channels along a waveguide 182. For instance, a first WDM filter 176 configured to reflect only the wavelength $\lambda_2$, a second WDM filter 178 configured to reflect only the wavelength $\lambda_3$, and a third WDM filter 180. The multi-channel optical signal $OPT_{MUX}$ can then be launched into one of the optical transmission media (e.g., the transmission media 22 of FIG. 1), such as an optical fiber or a waveguide (e.g., in a multi-mode manner). Similar to the example of FIG. 2, the waveguide can include the arrangement of mirror 174 and respective filters 176, 178 and 180, which can be mounted within a waveguide (e.g., a hollow metal waveguide) 184.

It is to be understood that, because the wavelength division multiplexing systems 50, 100, and 150 in the respective examples of FIGS. 2 through 4 can be implemented in the integrated package 12, the optical components of the wavelength division multiplexing systems 50, 100, and 150 can each be configured as a single component for each of the lasers 18 in the one or more arrays of lasers 14. For instance, the mirrors 56, 116, and 174, the WDM filters 58, 60, 62, 108, 110, 112, 176, 178, and 180, the optical medium 106, and the birefringent crystal 160 can each be respectively configured as a single optical component having sufficient dimensions to be implemented for each of the sets 16 of the respective lasers 18 in the laser array 14. As a result, the integrated package 12 of the optical data system 10 can be fabricated at a significantly low cost. Furthermore, it is to be understood that the wavelength division multiplexing systems 50, 100, and 150 could include different and/or additional optics configured to guide the optical data signals $OPT_1$ through $OPT_4$ generated by the respective sets 16 of lasers 18 onto the respective optical components. For instance, the half-wave plates can be omitted and instead employ lasers configured generate the signals directly with the desired orthogonal polarization states.

Figure 5:
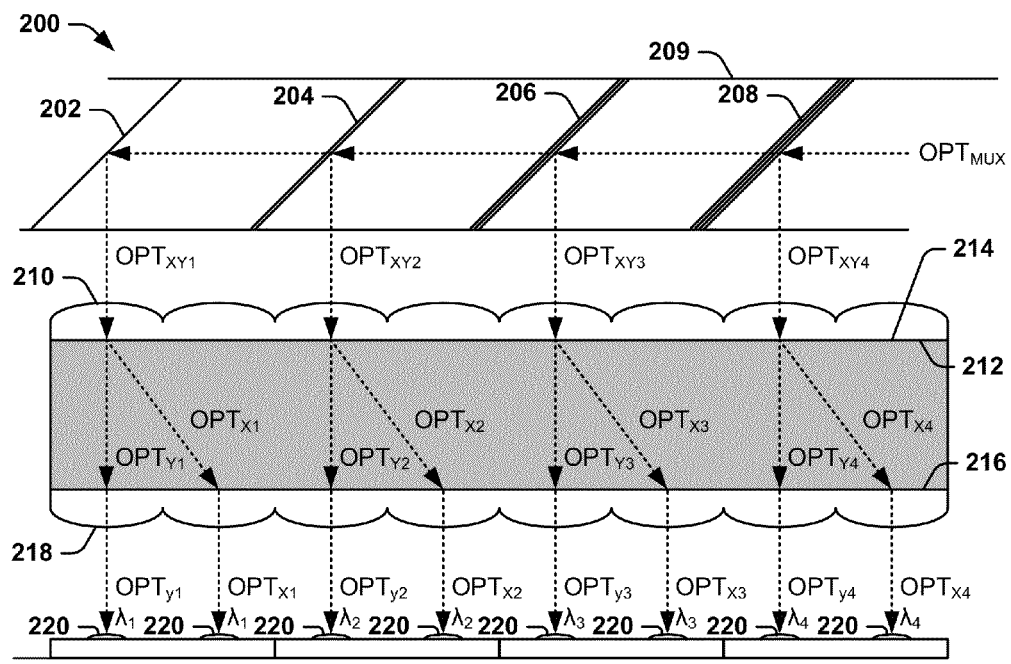
FIG. 5 illustrates an example of an optical wavelength/polarization demultiplexing system.

FIG. 5 illustrates an example of an optical demultiplexing system 200. The optical demultiplexing system 200 can be implemented at a destination device, such as may be optically coupled to a backplane of an associated computer system. As an example, the optical demultiplexing system 200 can be located at an optical receiver on the distal end of the optical transmission media (e.g., the media 22 in the example of FIG. 1) for the above example of the optical multiplexing system 150 of the example of FIG. 4.

The demultiplexing system 200 includes a mirror 202, a first WDM filter 204 configured to reflect only the wavelength $\lambda_2$, a second WDM filter 206 configured to reflect only the wavelength $\lambda_3$, and a third WDM filter 208 configured to reflect only the wavelength $\lambda_4$. Thus, in the example of FIG. 5, the third WDM filter 208 is configured to separate the dual-channel optical signal $OPT_{XY4}$ from the multi-channel optical data signal $OPT_{MUX}$. The third WDM filter 208 is configured to pass the dual-channel optical data signals $OPT_{XY1}$ through $OPT_{XY3}$ therethrough and to reflect the dual-channel optical data signal $OPT_{XY4}$ in an orthogonal direction. Similarly, the first and second WDM filters 204 and 206 separate the dual-channel optical signals $OPT_{XY2}$ and $OPT_{XY3}$, respectively, from the multi-channel optical data signal $OPT_{MUX}$, thus leaving on the dual-channel optical signal $OPT_{XY1}$. The dual-channel optical signal $OPT_{XY1}$ is reflected orthogonally via the mirror 202. Thus, the multi-channel optical data signal $OPT_{MUX}$ is wavelength division multiplexed to generate the dual-channel optical signals $OPT_{XY1}$ through $OPT_{XY4}$. The arrangement of mirror 202 and respective filters 204, 206 and 208 can be mounted within a waveguide (e.g., a hollow metal waveguide) 209, which can be an optical transmission medium that receives the multi-channel optical data signal $OPT_{MUX}$.

Each of the dual-channel optical signals $OPT_{XY1}$ through $OPT_{XY4}$ are provided to a lens array 210 coupled to a first surface 212 of a birefringent crystal 214. The birefringent crystal 214 can be configured to cause the optical data signals $OPT_{X1}$ through $OPT_{X4}$ to experience a predetermined amount of walk-off at each of the first surface 212 and a second surface 216, and to pass the optical data signals $OPT_{Y1}$ through $OPT_{Y4}$ with substantially no walk-off based on the respective polarizations of the optical data signals $OPT_X$ and $OPT_Y$. The respective pairs of optical data signals $OPT_{X1}$ through $OPT_{X4}$ and $OPT_{Y1}$ through $OPT_{Y4}$ exit the birefringent crystal 214 via a lens array 218. Accordingly, the dual-channel optical signals $OPT_{XY1}$ through $OPT_{XY4}$, and thus the multi-channel optical data signal $OPT_{MUX}$, are polarization demultiplexed via the birefringent crystal 214 to generate the optical data signals $OPT_{X1}$ through $OPT_{X4}$ and $OPT_{Y1}$ through $OPT_{Y4}$. The optical data signals $OPT_{X1}$ through $OPT_{X4}$ and $OPT_{Y1}$ through $OPT_{Y4}$ can be received by a set of photodiodes 220, which can be configured to convert the optical data signals $OPT_{X1}$ through $OPT_{X4}$ and $OPT_{Y1}$ through $OPT_{Y4}$ into respective electrical data signals that can be further filtered and/or processed.

Figure 6:
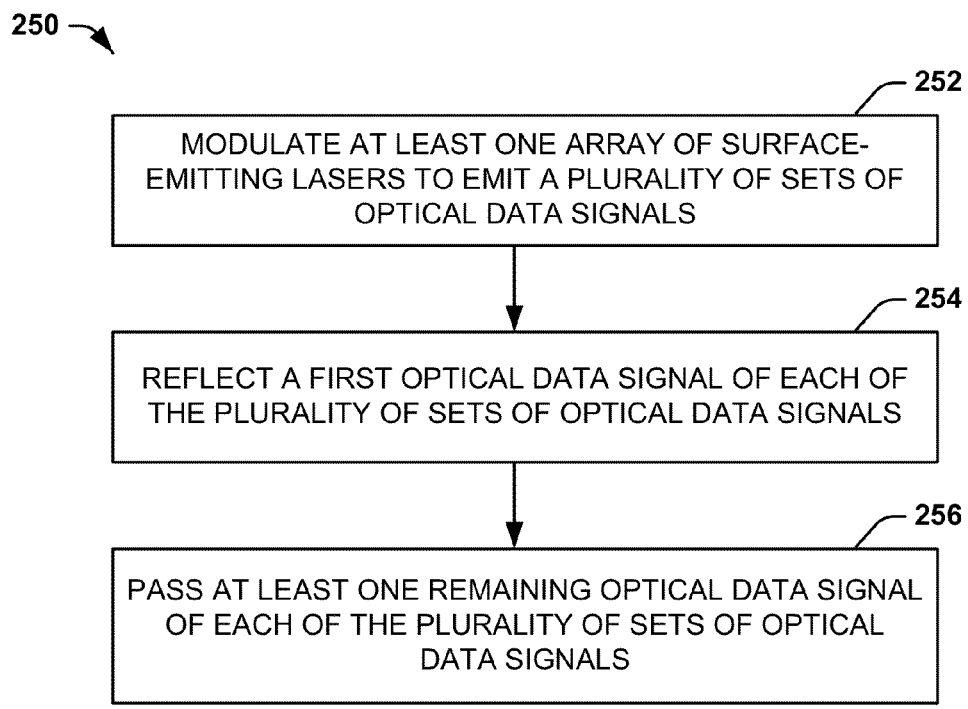
FIG. 6 is a flow diagram illustrating an example of a method for multiplexing optical signals.

In view of the foregoing structural and functional features described above, an example methodology will be better appreciated with reference to FIG. 6. While, for purposes of simplicity of explanation, the methodology of FIG. 6 is shown and described as executing serially, it is to be understood and appreciated that the present invention is not limited by the illustrated order, as some embodiments could in other embodiments occur in different orders and/or concurrently from that shown and described herein.

FIG. 6 illustrates an example of a method 250 for multiplexing optical signals. At 252, at least one array of surface-emitting lasers (e.g., the lasers 54 in FIG. 2) are modulated to emit a plurality of sets of optical data signals. Each of the optical data signals in each of the plurality of sets can have a distinct wavelength. At 254, a first optical data signal of each of the plurality of sets of optical data signals having a first wavelength is reflected from a wavelength-division multiplexing (WDM) filter (e.g., the filter 58 of FIG. 2). At 256, at least one remaining optical data signal of each of the plurality of sets of optical data signals having respective wavelengths different from the first wavelength is passed through the WDM filter (e.g., the filter 58 of FIG. 2).

What have been described above are examples. It is, of course, not possible to describe every conceivable combination of components or methodologies, but one of ordinary skill in the art will recognize that many further combinations and permutations are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements.

The invention claimed is:

1. An integrated optical data transmission system comprising:
    an array of lasers that are modulated by a plurality of modulation signals to provide a plurality of sets of optical data signals, each of the optical data signals in each of the plurality of sets having a distinct wavelength; and
    a wavelength division multiplexing system to combine each of the plurality of sets of optical data signals to generate a plurality of multi-channel optical data signals that are transmitted from the integrated optical data transmission system via respective optical transmission media, wherein the wavelength division multiplexing system comprises a solid optical medium comprising a first surface to which a wavelength-division multiplexing (WDM) filter is coupled, the solid optical medium being oriented at an angle with respect to the array of lasers based on the refractive index of the solid optical medium, such that each signal of the plurality of sets of optical data signals propagates through the solid optical medium at a refracted angle selected to combine each of the plurality of sets of optical data signals by reflecting an optical data signal from a mirror coupled to a second surface of the solid optical medium spaced apart from and opposite the first surface and by reflecting the additional optical data signal from the WDM filter.

2. The system of claim 1, wherein the optical transmission medium is a hollow metal waveguide to propagate the plurality of multi-channel optical data signals 3. The system of claim 1, wherein each of the plurality of sets of optical data signals comprises a plurality of pairs of orthogonally polarized optical data signals, each of the plurality of pairs of orthogonally polarized optical data signals having the plurality of distinct wavelengths, wherein the wavelength division multiplexing system comprises:
    a birefringent crystal to receive each of the pairs of orthogonally polarized optical data signals in a parallel arrangement at a first surface and to combine each of the pairs of orthogonally polarized optical data signals by causing a first signal of each of the pairs of orthogonally polarized optical data signals to walk-off at the first surface and a second surface spaced apart from and opposite the first surface and the (WDM) filter to reflect a first of the pairs of the orthogonally polarized optical data signals of the plurality of optical data signals having a first wavelength and to pass the remaining pair of the orthogonally polarized optical data signals having respective wavelengths different from the first wavelength.

4. The system of claim 3, further comprising a polarizing structure integrally coupled with the birefringent crystal to orthogonally polarize a first optical data signal of each of a plurality of pairs of optical data signals emitted from the array of lasers to provide the respective plurality of pairs of orthogonally polarized optical data signals.

5. The system of claim 1, wherein the wavelength division multiplexing system comprises an integrated optical component having dimensions such that each of the plurality of sets of optical data signals are incident upon the integrated optical component for generation of the plurality of multi-channel optical data signals.

6. The system of claim 1, wherein the array of lasers is an array of surface-emitting lasers having a common substrate, the array being one of a one-dimensional array or a two-dimensional array.

7. The system of claim 6, wherein the surface-emitting lasers are vertical cavity surface-emitting lasers (VCSELs).

8. The system of claim 6, wherein the surface-emitting lasers comprise a two dimensional array of lasers, in which a pair of lasers in a given direction of the array have the same wavelength and substantially orthogonal polarization states.

9. A method for multiplexing optical signals, the method comprising:
    modulating an array of surface-emitting lasers to emit a plurality of sets of optical data signals comprising a plurality of pairs of orthogonally polarized optical data signals, each of the pairs of orthogonally polarized optical data signals in each of the plurality of sets having a distinct wavelength;
reflecting a first optical data signal of each of the plurality of sets of optical data signals having a first wavelength from a wavelength-division multiplexing (WDM) filter; and
passing a remaining optical data signal of each of the plurality of sets of optical data signals having respective wavelengths different from the first wavelength through the WDM filter.

10. The method of claim 9, further comprising reflecting the remaining optical data signal of each of the plurality of sets of optical data signals from a minor coupled to a first surface of a solid optical medium oriented at an angle with respect to the array of surface-emitting lasers, the first surface being spaced apart from and opposite a second surface to which the WDM filter is coupled such that the second data signal is reflected toward the WDM filter.

11. The method of claim 10, wherein the angle is selected such that each signal of the plurality of sets of optical data signals propagates through the solid optical medium at a refracted angle selected to combine each of the plurality of sets of optical data signals by reflecting an optical data signal from a minor coupled to the second surface and by reflecting the additional optical data signal from the WDM filter.

12. The method of claim 9, further comprising
combining each of the pairs of orthogonally polarized optical data signals in each of the plurality of sets of optical data signals, wherein reflecting the first optical data signal comprises reflecting a first of the pairs of the orthogonally polarized optical data signals of each of the plurality of sets of optical data signals having a first wavelength, and wherein passing the remaining optical data signal comprises passing the remaining pairs of the orthogonally polarized optical data signals in each of the plurality of sets of optical data signals having respective wavelengths different from the first wavelength.

13. The method of claim 12, further comprising:
emitting each of the pairs of orthogonally polarized optical data signals directly from the array of surface-emitting lasers in a parallel arrangement onto a first surface of a birefringent crystal; and
causing a first signal of the each of the pairs of orthogonally polarized optical data signals to walk-off at each of the first surface and a second surface of the birefringent crystal spaced apart from and opposite the first surface to combine each of the pairs of orthogonally polarized optical data signals in each of the plurality of sets of optical data signals.

14. The method of claim 9, wherein the array of surface-emitting lasers is one of a two-dimensional array and a plurality of one-dimensional arrays.

15. The method of claim 9, wherein the wavelength division multiplexing system further comprises a hollow metal waveguide that is an optical transmission medium to propagate the plurality of sets of optical data signals.

16. An integrated optical data transmission system comprising:
an array of vertical cavity surface-emitting lasers (VCSELs) that are modulated by a plurality of modulation signals to provide a plurality of optical data signals, each of the plurality of optical data signals having a distinct wavelength, the array of VCSELs being one of a two-dimensional array and a plurality of one-dimensional arrays, the array of VCSELs having a common substrate; and
a wavelength division multiplexing system to directly receive and combine each of the plurality of optical data signals to generate a multi-channel optical data signal, the array of VCSELs and the wavelength division multiplexing system being arranged within an integrated package, the wavelength division multiplexing system comprising a hollow metal waveguide that is an optical transmission medium to propagate the multi-channel optical data signal.

17. The system of claim 16, wherein the plurality of optical data signals comprises a plurality of pairs of orthogonally polarized optical data signals, each of the pairs of orthogonally polarized optical data signals having the distinct wavelengths, wherein the wavelength division multiplexing system comprises a birefringent crystal to receive each of the pairs of orthogonally polarized optical data signals in a parallel arrangement at a first surface and to combine each of the pairs of orthogonally polarized optical data signals by causing a first signal of each of the pairs of orthogonally polarized optical data signals to walk-off at the first surface and a second surface spaced apart from and opposite the first surface.

18. The system of claim 16, wherein the wavelength division multiplexing system comprises a solid optical medium oriented at an angle with respect to the array of VCSELs, wherein the angle is selected such that each of the plurality of optical data signals propagates through the solid optical medium at a refracted angle selected to combine each of the plurality of optical data signals by reflecting an optical data signal from a mirror coupled to a second surface of the solid optical medium spaced apart from and opposite the first surface and by reflecting the additional optical data signal from the WDM filter.

19. An integrated optical data transmission system comprising:
an array of lasers that are modulated by a plurality of modulation signals to provide a plurality of sets of optical data signals, each of the optical data signals in each of the plurality of sets having a distinct wavelength; and
a wavelength division multiplexing system to combine each of the plurality of sets of optical data signals to generate a plurality of multi-channel optical data signals that are transmitted from the integrated optical data transmission system via respective optical transmission media, wherein each of the plurality of sets of optical data signals comprises a plurality of pairs of orthogonally polarized optical data signals, each of the plurality of pairs of orthogonally polarized optical data signals having the plurality of distinct wavelengths, wherein the wavelength division multiplexing system comprises:
a birefringent crystal to receive each of the pairs of orthogonally polarized optical data signals in a parallel arrangement at a first surface and to combine each of the pairs of orthogonally polarized optical data signals by causing a first signal of each of the pairs of orthogonally polarized optical data signals to walk-off at the first surface and a second surface spaced apart from and opposite the first surface and the a wavelength-division multiplexing (WDM) filter to reflect a first of the pairs of the orthogonally polarized optical data signals of the plurality of optical data signals having a first wavelength and to pass the remaining pair of the orthogonally polarized optical data signals having respective wavelengths different from the first wavelength.

20. The system of claim 19, further comprising a polarizing structure integrally coupled with the birefringent crystal to orthogonally polarize a first optical data signal of each of a plurality of pairs of optical data signals emitted from the array of lasers to provide the respective plurality of pairs of orthogonally polarized optical data signals.

\* \* \* \* \*

UNITED STATES PATENT AND TRADEMARK OFFICE
CERTIFICATE OF CORRECTION

| | | |
|---|---|---|
| PATENT NO. | : 9,065,587 B2 | Page 1 of 1 |
| APPLICATION NO. | : 13/825950 | |
| DATED | : June 23, 2015 | |
| INVENTOR(S) | : Wayne V. Sorin et al. | |

It is certified that error appears in the above-identified patent and that said Letters Patent is hereby corrected as shown below:

On the title page, item (75), Inventors, in column 1, line 1, delete "Moutain" and insert -- Mountain --, therefor.

In the claims

In column 11, line 14, in Claim 10, delete "minor" and insert -- mirror --, therefor.

In column 11, line 25, in Claim 11, delete "minor" and insert -- mirror --, therefor.

In column 12, line 58, in Claim 19, delete "and the a" and insert -- and the --, therefor.

Signed and Sealed this
First Day of December, 2015

Michelle K. Lee
*Director of the United States Patent and Trademark Office*